Patented June 19, 1945

2,378,594

UNITED STATES PATENT OFFICE 2,378,594

STABILIZING OF NITROCELLULOSE

Donald R. Swan and John M. Calhoun, Rochester, N. Y., assignors to Eastman Kodak Company, Rochester, N. Y., a corporation of New Jersey No Drawing. Application November 19, 1942, Serial No. 466,227

7 Claims. (Cl. 106—186)

This invention relates to the stabilization of nitrocellulose with hydrazide compounds.

It is commonly recognized that cellulose nitrate is none too stable and ordinarily requires treatment to fit it for the purpose at hand. In the case of highly nitrated cellulose, such as employed for explosives, it is frequently only necessary that the stabilizer be sufficient to prevent any spontaneous ignition thereof. However, in the case of nitrocelluloses which are employed for various commercial products, such as sheeting, plastics, or lacquers, it is also desirable that the nitrocellulose be stabilized so that it does not discolor over a long period of time. Nitrocellulose which has been stabilized to avoid igniting is not considered to be sufficiently stabilized for use in products in which a fairly long life is desired. Therefore, it is desirable to so treat the nitrocellulose that its resistance to the formation of nitrogen oxides therein is enhanced, as it is believed that it is the formation of nitrogen oxides within the body of the nitrocellulose material which sometimes causes a yellow or brown discoloration therein, and which causes the fading of dyes when incorporated in that material.

To retard this gradual discoloration in sheets or products prepared from nitrocellulose upon long storing, seasoning, or exposure to the atmosphere, various materials have been incorporated in the nitrocellulose. The stabilizers must be such that they can be (1) thoroughly incorporated in the nitrocellulose, (2) compatible with the plasticizers used, (3) are soluble in the solvent for the nitrocellulose when solvent is used, (4) must not decompose at the temperature of working, and (5) must retain their stabilizing characteristics over a long period. Urea has commonly been referred to as suitable for use in this connection. However, we have found stabilizing materials which are much more effective in preventing the decomposition of nitrocellulose than urea.

We have found that certain hydrazides, when incorporated in nitrocellulose, considerably enhance the resistance of that material to decomposition so that that material may be employed in ordinary uses without evidencing any noticeable discoloration. We have found that certain of the monohydrazides and trihydrazides of organic acids are highly effective for this purpose and show stability factors more than twice that of urea. The monohydrazides which we have found to be particularly suitable are the following: oxamic hydrazide, γ-phenoxybutyric hydrazide, cyanacetic hydrazide, palmitic hydrazide, carbamic hydrazide (semi-carbazide), gluconic hydrazide, 4,4-diphenyl semi-carbazide, and nicotinic hydrazide.

We have also found that the following trihydrazides are of value for stabilizing nitrocellulose: citric trihydrazide and acetone tricarballylic hydrazone.

We have found that these hydrazides have a stability factor more than twice that of urea and that they are also capable of uniform distribution in nitrocellulose and are compatible with the ordinary plasticizers employed for nitrocellulose, such as dibutyl phthalate, camphor, triphenyl phosphate, and the like. These hydrazides are also soluble in the usual solvents for nitrocellulose such as methyl alcohol, acetone, cellosolves, alkyl esters, and the like. These hydrazides also resist decomposition at the temperature at which the nitrocellulose is formed into commercial products and retain their stabilizing value over a long period of time.

We have found that these stabilizing materials are most effective when incorporated in the proportion of at least 0.4% based on the weight of the nitrocellulose. However, smaller proportions of these stabilizing agents than 0.4% give some stabilizing action. For instance, even as low a percentage as 0.1% will increase the resistance of nitrocellulose to decomposition. It has been our experience that proportions of stabilizing agents of not more than 2% give as high a degree of stabilizing as desired and, therefore, there is no purpose in employing proportions above 2% unless the stabilizing agent also exerts some additional function in larger quantities. Our invention broadly, however, contemplates any composition of nitrocellulose with a stabilizing amount of one of the hydrazides or a mixture of the hydrazides listed.

The effectiveness of stabilizing agents for nitrocellulose is determined by comparing the amount of nitrous acid given off by nitrocellulose containing a stabilizing agent compared with nitrocellulose in which no stabilizing agent has been incorporated. This is determined by first curing the samples 18 hours at 135° F. and then for 1 hour at 250° F. Samples of about 0.5 gram are then cut into small pieces and placed in a clean, dry 100 cc. glass bottle. 50 cc. of a standard solution in acetic acid of sulfanilic acid and α-naphthylamine hydrochloride is then added. The bottle is closed and is placed in a constant temperature bath at 80° F. for 24 hours. The solution is then decanted into a glass cell and the concentration of the red dye present is determined in a photometer. The concentration of nitrous acid present is then determined from a calibration curve. To determine the stability factor of the stabilizing agent the percentage of nitrous acid is compared with that of the check in which no stabilizing agent was used, thus determining the efficiency of the stabilizing agent. For instance, if the sample showed a nitrous acid content of $7 \times 10^{-4}\%$ and the check showed a nitrous acid content of $150 \times 10^{-4}\%$ then the stability factor would be obtained by subtracting 7 from 150 and solving the equation $$\frac{143}{150} \times 100$$

When urea is employed for stabilizing nitrocellulose a stability factor of approximately 43 is obtained. The stability factors of the various hydrazides and the concentrations which were employed are as follows:

| | Stability factor | Concentration used, percent |
|---|---|---|
| Oxamic hydrazide | 98 | 0.5 |
| γ-Phenoxy butyric hydrazide | 95 | 0.9 |
| Cyanacetic hydrazide | 98 | 0.45 |
| Palmitic hydrazide | 95 | 1.1 |
| Semicarbazide | 94 | 1.0 |
| Gluconic hydrazide | 93 | 1.0 |
| Diphenyl semicarbazide | 90 | 1.0 |
| Nicotinic hydrazide | 94 | 1.0 |
| Citric trihydrazide | 95 | 0.4 |
| Acetone tricarballylic hydrazone | 97 | 0.5 |

The method of incorporating the hydrazide stabilizing agent is not critical, it only being desirable that the material be uniformly incorporated in the nitrocellulose. For instance, for the preparation of sheeting the most convenient method of incorporating the stabilizing agent is to dissolve it in the solution of the nitrocellulose in volatile solvent prior to the formation of the sheeting. This method is also very satisfactory for treating nitrocellulose to be employed in making artificial leather or coating compositions such as lacquers. If, however, desired it may be that other methods of incorporation can be employed, such as treating the finished product with a solution of the stabilizing agent for a sufficient time to incorporate some stabilizing agent therein. Another method by which these hydrazide stabilizing agents may be incorporated in the nitrocellulose is by treating the nitrocellulose with a solution of the stabilizing agent immediately after its manufacture, while the nitrocellulose is still in fibrous form, such as immediately prior to drying after the nitrated acids have been washed off. For plastic compositions the stabilizing agent may be incorporated by working nitrocellulose material and the stabilizing agent together over hot rolls so that the stabilizing agent is incorporated in the nitrocellulose, while in a softened condition. By this means a fairly uniform distribution of stabilizing agent in the plastic material will be obtained.

The following example illustrates the preparation of a composition in accordance with our invention:

100 parts of nitrocellulose having a nitrogen content of 11.8% was dissolved in a mixture of 380 parts of methyl alcohol and 20 parts of acetone, along with 5 parts of dibutyl phthalate and 1 part of a stabilizer of the type listed herein. A viscous solution or "dope" was formed. This liquid was coated onto a film-forming surface such as ordinarily employed for preparing cellulose nitrate sheeting. The sheeting was subjected to curing with hot, dry air at a temperature of 120° F. to 250° F., following which it was removed from the curing chamber and rolled up to form a roll of the cellulose nitrate sheeting.

The stabilizing agents listed herein are suitable for stabilizing either plasticized or unplasticized nitrocellulose as they are effective to retard the decomposition of the nitrocellulose in either case. Our invention is particularly adapted to the stabilizing of the lower nitrated celluloses, such as those having a nitrogen content of 11.4 to 12.2%, such as a nitrocellulose prepared by the process described and claimed in U. S. Patent 2,118,275 of Talbot, cellulose nitrates of this nitrogen content being commonly employed for the manufacture of sheeting, plastic products, and the like. For instance, cellulose nitrate sheeting may be prepared as described in U. S. Patent No. 1,900,873 of Van der Hoef in which a stabilizing proportion of one of the hydrazides listed is incorporated in the "dope" prior to the coating out onto a film-forming surface.

We claim:

1. A composition of matter essentially consisting of nitrocellulose containing therein to inhibit decomposition of the nitrocellulose a small proportion of a hydrazide selected from the group consisting of oxamic hydrazide, γ-phenoxy butyric hydrazide, cyanacetic hydrazide, palmitic hydrazide, semicarbazide, gluconic hydrazide, diphenyl semicarbazide, nicotinic hydrazide, citric trihydrazide, and acetone tricarballylic hydrazone.

2. A composition of matter essentially consisting of nitrocellulose having a nitrogen content of 11.4 to 12.2% containing therein to inhibit decomposition of the nitrocellulose a small proportion of a hydrazide selected from the group consisting of oxamic hydrazide, γ-phenoxy butyric hydrazide, cyanacetic hydrazide, palmitic hydrazide, semicarbazide, gluconic hydrazide, diphenyl semicarbazide, nicotinic hydrazide, citric trihydrazide, and acetone tricarballylic hydrazone.

3. A composition of matter essentially consisting of nitrocellulose containing therein to inhibit decomposition of the nitrocellulose a small proportion of oxamic hydrazide.

4. A composition of matter essentially consisting of nitrocellulose containing therein to inhibit decomposition of the nitrocellulose a small proportion of palmitic hydrazide.

5. A composition of matter essentially consisting of nitrocellulose containing therein to inhibit decomposition of the nitrocellulose a small proportion of semicarbazide.

6. A composition of matter essentially consisting of nitrocellulose, a compatible plasticizer therefor, containing therein to inhibit decomposition of the nitrocellulose a small proportion of a hydrazide selected from the group consisting of oxamic hydrazide, γ-phenoxy butyric hydrazide, cyanacetic hydrazide, palmitic hydrazide, semicarbazide, gluconic hydrazide, diphenyl semicarbazide, nicotinic hydrazide, citric trihydrazide, and acetone tricarballylic hydrazone.

7. A composition of matter essentially consisting of nitrocellulose having a nitrogen content of 11.4 to 12.2% and approximately 1% (based on the weight of the nitrocellulose) of a hydrazide selected from the group consisting of oxamic hydrazide, γ-phenoxy butyric hydrazide, cyanacetic hydrazide, palmitic hydrazide, semicarbazide, gluconic hydrazide, diphenyl semicarbazide, nicotinic hydrazide, citric trihydrazide, and acetone tricarballylic hydrazone.

DONALD R. SWAN.
JOHN M. CALHOUN.